(12) United States Patent
Santhanam et al.

(10) Patent No.: US 7,483,388 B2
(45) Date of Patent: Jan. 27, 2009

(54) METHOD AND SYSTEM FOR SENDING A MULTIMEDIA STREAM IN AN IP MULTICAST NETWORK

(75) Inventors: Srinivasan Santhanam, Adyar (IN); Mahesh Vittal, Villivakkam (IN); Suresh Pachiappan, Kotturpuram (IN); Balaji Venakat Venkataswami, Chennai (IN); Anand Jayaraman, Chennai (IN); Pandiarajan Selvaraj, Madurai (IN)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 11/167,004

(22) Filed: Jun. 23, 2005

(65) Prior Publication Data

US 2007/0008966 A1 Jan. 11, 2007

(51) Int. Cl.
*H04L 12/26* (2006.01)
*H04L 12/56* (2006.01)

(52) U.S. Cl. ...................... 370/252; 370/390

(58) Field of Classification Search .............. 370/252, 370/254, 312, 389, 390–392, 400, 401, 477
See application file for complete search history.

(56) References Cited

U.S. PATENT DOCUMENTS

| 7,191,332 | B1* | 3/2007 | Pankajakshan et al. | 713/163 |
| 2003/0007485 | A1* | 1/2003 | Venkitaraman et al. | 370/389 |
| 2005/0071496 | A1 | 3/2005 | Singal et al. | |
| 2006/0023733 | A1* | 2/2006 | Shimizu et al. | 370/432 |
| 2006/0222078 | A1* | 10/2006 | Raveendran | 375/240.16 |
| 2006/0224762 | A1* | 10/2006 | Tian et al. | 709/231 |
| 2006/0227870 | A1* | 10/2006 | Tian et al. | 375/240.03 |

* cited by examiner

*Primary Examiner*—Hong Sol Cho
(74) *Attorney, Agent, or Firm*—Trellis IP Law Group, PC

(57) ABSTRACT

A method and system for sending a multimedia stream in IP multicast networks are provided. IGMP report data is collected by a plurality of routers. The routers report the IGMP report data to a netflow collection server. The netflow collection server collates the IGMP report data. The collated IGMP report data is forwarded to an encoder coordinator. The encoder coordinator adaptively computes an encoding rate of the multimedia stream. The encoded multimedia stream is sent to a plurality of receivers at the encoding rate.

20 Claims, 5 Drawing Sheets

METHOD AND SYSTEM FOR SENDING A MULTIMEDIA STREAM IN AN IP MULTICAST NETWORK

BACKGROUND OF THE INVENTION

1. Field of Invention

The embodiments of the invention relate in general to Internet protocol (IP) multicast networks. More specifically, the embodiments of the invention relate to methods and systems for adaptively computing an encoding rate of a multimedia stream in an IP multicast network.

2. Description of the Background Art

Multimedia data, such as audio and video, has become a common and increasingly popular form of content transmitted across modern communication networks. Typically, while accessing multimedia data across a network, a user had to wait for the entire file to be downloaded before he could use the information. Streaming technology allows the multimedia data to be delivered to the user as a continuous flow with minimal delay, before playback can begin. Streaming is a server/client technology that allows live or pre-recorded data to be broadcast in real time.

There are two key streaming delivery techniques for multimedia data—unicast and multicast. Unicast refers to a networking technique, in which a single data stream is directed from a server to a single network device, in response to a request from the network device. This is the traditional way to send information to a single recipient, or to a few recipients. In this one-to-one relationship, a single message is transmitted to a recipient's unique address. When sending the same message to multiple recipients via unicast data streams, a separate copy of the message is transmitted to each recipient's individual address. Unicast data streaming is adequate for many on-demand multimedia systems, and for delivering multimedia streams to a limited number of recipients. However, as the number of network devices making requests to the server increases, a lot of network bandwidth is wasted.

IP multicast is a bandwidth-conserving technology that reduces traffic by simultaneously delivering a single data stream to multiple recipients. IP multicast networking operates by transmitting a single data stream from a server to a group of receivers connected to the network. Multicast routers control the flow of the single data stream along the network. Multicast is based on the concept of a group, which includes receivers who express an interest in receiving a particular data stream. Since, the server needs to send only a single stream of data, the IP multicast preserves the network bandwidth. Replication of a single stream of data is done in the IP multicast networks if there are more than one outgoing interfaces (OIFs), and the receivers are present on the OIFs. An IP multicast is applied in areas such as videoconferencing, corporate communications, distance learning, and distribution of software, stock quotes and news.

In a conventional IP multicast, a multimedia stream is typically encoded at a source at a predetermined transmission rate, with the assumption that the network would always have sufficient bandwidth to support the rate at which the multimedia stream is encoded. However, if the multimedia stream is encoded at a transmission rate that is greater than the available transmission rate, the receiver may be unable to receive the information at the data rate necessary to support the underlying application, thereby causing the application to be disrupted or give a degrading performance. The conventional IP multicast networks lack an efficient mechanism to change the encoding rate of the multimedia streams according to a user-defined priority. Also, the conventional IP multicast networks lack an efficient mechanism to compute the encoding rate of the more popular multimedia streams in a way that ensures better delivery of the more popular multimedia streams over the less popular multimedia streams. As a result, there may not be efficient bandwidth utilization in the conventional IP multicast networks.

DETAILED DESCRIPTION OF EMBODIMENTS OF THE INVENTION

The embodiments of the invention provide a method, a system and a computer-readable medium for sending a multimedia stream in an IP multicast network. The embodiments of the invention provide a method by which the statistics regarding the number of active multicast receivers for a live multimedia stream is collected and used as a feedback to vary the encoding rate of the multimedia stream based on the popularity and the demand. In various embodiments of the invention, the multimedia stream can be an audio/video stream.

Figure 1:
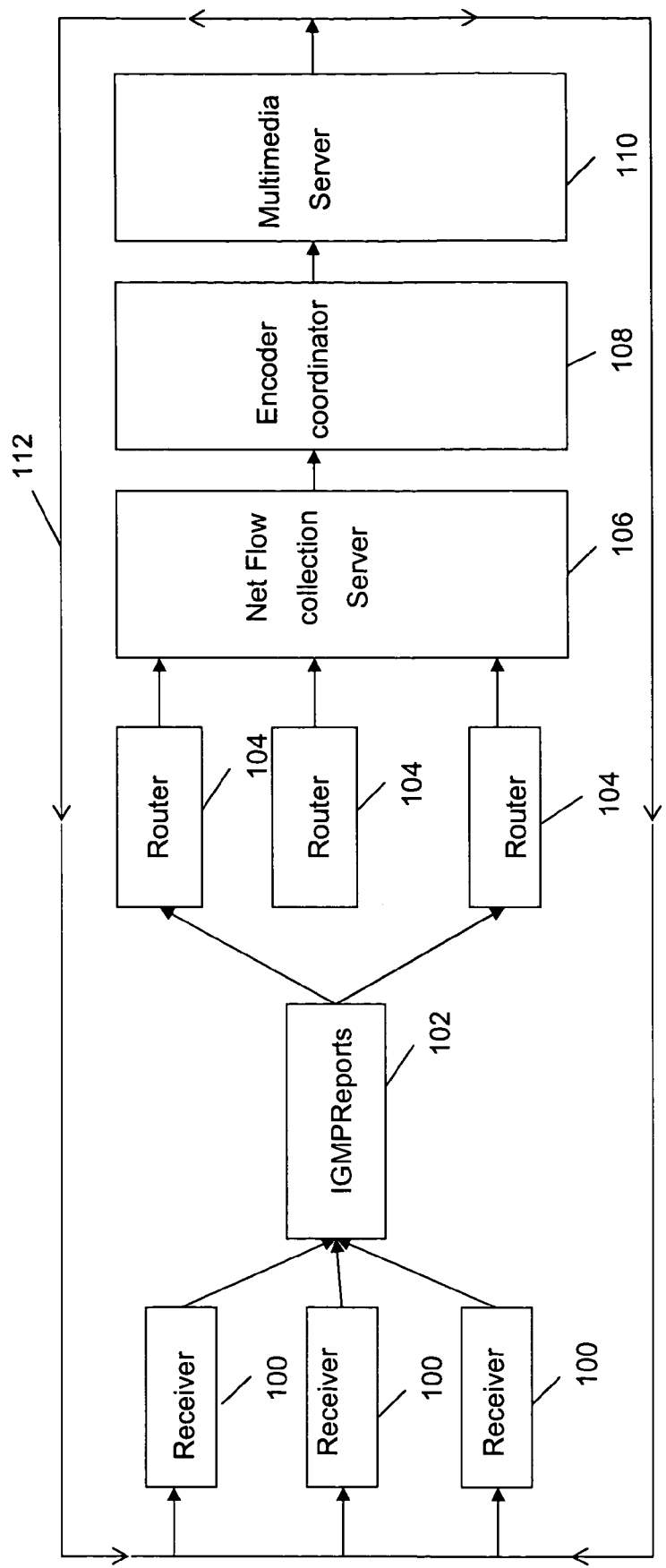
FIG. 1 illustrates a system for sending a multimedia stream in an IP multicast network, in accordance with various embodiments of the invention.

FIG. 1 illustrates a system for sending a multimedia stream in an IP multicast network, according to an exemplary embodiment of the invention. As depicted in FIG. 1, Internet Group Management Protocol (IGMP) reports 102 (hereinafter referred to as the IGMP report data) are sent by a plurality of receivers (hereinafter referred to as receivers) 100 to their respective routers 104. In various embodiments of the invention, receivers are individual hosts which express an interest in receiving a particular multimedia stream in IP multicast network. In an embodiment of the invention, routers 104 are first hop multicast routers (FHMRs). For the purpose of describing FIG. 1, routers 104 are hereinafter construed as FHMR 104. IGMP is a protocol, which is used to dynamically register individual receivers in a multicast group on a particular LAN. Receivers 100 identify group memberships by sending IGMP messages to their local multicast router. Under IGMP, routers listen to IGMP messages and periodically send out queries to discover which groups are active or inactive on a particular subnet. The embodiments of the invention should not be construed to be limited to IGMP only. Other Internet protocols can also be used for registering receivers in an IP multicast network. In various embodiments of the invention, FHMR 104 processes the collected IGMP report data. For example, FHMR 104 can process the collected IGMP report data to create an IGMP database, which includes multicast group address, reporter address and source address, in case of IGMP version 3 (v3). In the case of IGMP version 1 (v1) and IGMP version 2 (v2), because of report suppression performed in the host, the FHMR 104 does not have all the receivers in the multicast database.

FHMR 104 reports the IGMP report data to a net flow collection server (NFCS) 106. In various embodiments of the invention, FHMR 104 is configured with the IP address of NFCS 106. This is to specify the address of NFCS 106 to which the IGMP report data has to be sent. NFCS 106 collates the IGMP report data. At NFCS 106, there is an application listening on a port, which may be the same as the port for the default NFCS. The component/process so listening on the port collects the IGMP report data from FHMR 104. Once the IGMP report data is collected from FHMR 104, a summation of the number of receivers 100 registered with each of the participating FHMR 104, per multicast group per source, is performed. The summation provides the total number of receivers 100 per multicast group per source, which are registered to receive the multicast stream for a multicast group, from a specific source. In an embodiment of the invention, there might not be source-specific registrations for a multicast group. In such a case, all receivers registered for the multicast groups without a specific source are summed up, and the default source for that multicast group is taken. In an embodiment of the invention, the collation of the IGMP report data may be performed on a component, which is distinct from NFCS 106. In such a case, the IP address of the component is configured on FHMR 104.

After collation of the IGMP report data, NFCS 106 forwards the collated IGMP report data to an encoder coordinator (EC) 108. EC 108 adaptively computes an encoding rate of the multimedia stream. EC 108 may degrade or upgrade the encoding rate of the multimedia stream, as may be required, on the basis of popularity and demand of the multimedia stream. A multimedia server 110 sends the encoded multimedia stream via closed loop feedback connection 112 to receivers 100 at the encoding rate that is computed by EC 108.

Figure 2:
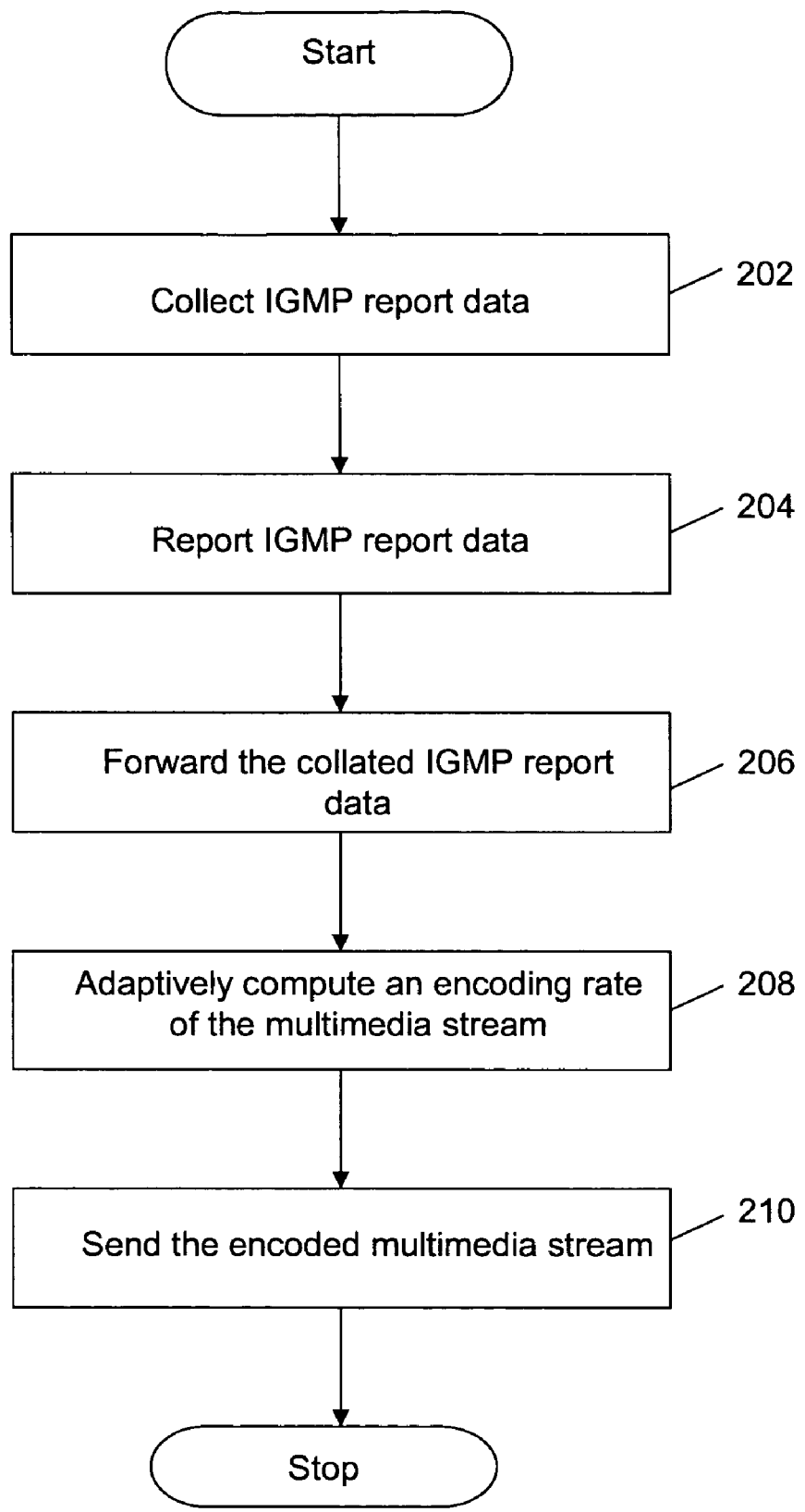
FIG. 2 is a flowchart illustrating a method for sending a multimedia stream in an IP multicast network, in accordance with various embodiments of the invention.

FIG. 2 is a flow chart illustrating a method for sending a multimedia stream in an IP multicast network, in accordance with various embodiments of the invention. At step 202, FHMR 104 collects the IGMP report data from receivers 100. FHMR 104 processes the IGMP report data. Exemplary processing actions that can be performed by FHMR 104 have been described earlier in conjunction with FIG. 1. At step 204, the IGMP report data is reported to NFCS 106 by FHMR 104. NFCS 106 collates the IGMP report data. At step 206, NFCS 106 forwards the collated IGMP report data to EC 108. At step 208, EC 108 adaptively computes an encoding rate. EC 108 may degrade or upgrade the encoding rate of the multimedia stream, as may be required, on the basis of the popularity and the demand of the multimedia stream. At step 210, the encoded multimedia stream is sent to receivers 100 at the encoding rate that is computed by EC 108.

In an exemplary embodiment of the invention, an Internet service provider (ISP) network contains sources for the multimedia streams within it. An ISP network is involved in sending multimedia streams to receivers 100, who are clients of the ISP network. In such a case, EC 108 is a part of the ISP network. Receivers 100 could be connected from remote locations into the ISP network through provider edge equipment (PE) devices such as remote access servers or through other manifestations of PE devices. In an embodiment, the PE device is FHMR 104.

Figure 3:
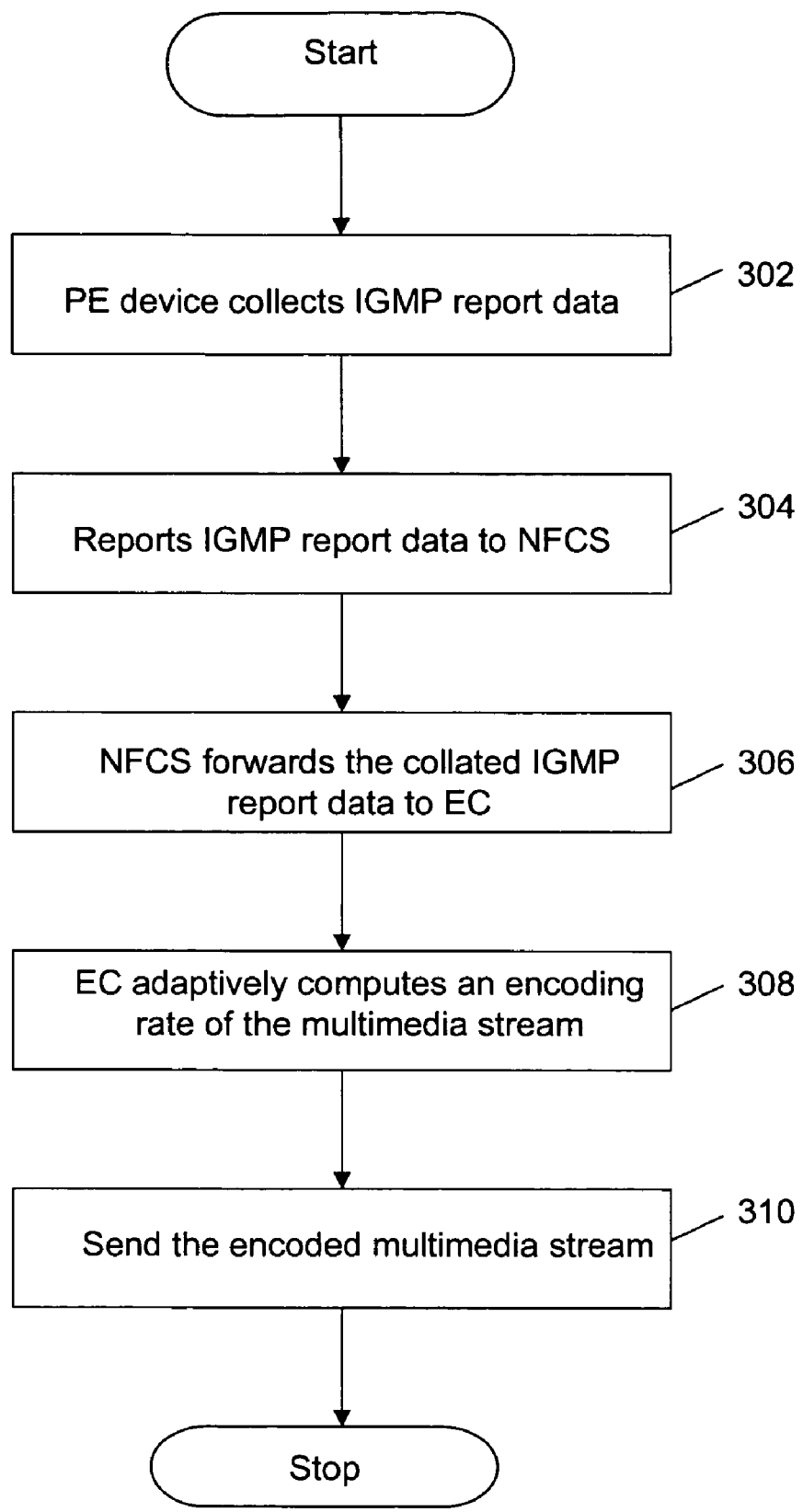
FIG. 3 is a flowchart illustrating a method for sending a multimedia stream in an ISP network, in accordance with various embodiments of the invention.

FIG. 3 is a flowchart illustrating a method for sending a multimedia stream in an ISP network, in accordance with various embodiments of the invention. At step 302, PE devices collect IGMP report data from receivers 100. PE devices process the IGMP report data. At step 304, the IGMP report data is reported to NFCS 106 by PE devices. NFCS 106 collates the IGMP report data. At step 306, NFCS 106 forwards the collated IGMP report data to EC 108. At step 308, EC 108 adaptively computes an encoding rate. EC 108 may degrade or upgrade the encoding rate of the multimedia stream, as may be required, on the basis of popularity and demand of the multimedia stream. At step 310, the encoded multimedia stream is sent to receivers 100 at the encoding rate that is computed by EC 108.

In another exemplary embodiment of the invention, the ISP network provides a tunnel service to virtual private network (VPN) sites. In such a case, the source/sources for multimedia streams lie within the VPN sites. FHMR 104 and NFCS 106 also lie within the VPN sites, close to the source/sources. EC 108 lies within the VPN sites. The ISP network transports the multimedia streams and the control packets containing the statistics for the architecture envisioned to EC 108 tuning within participating receivers 100 lying within VPN sites.

Figure 4:
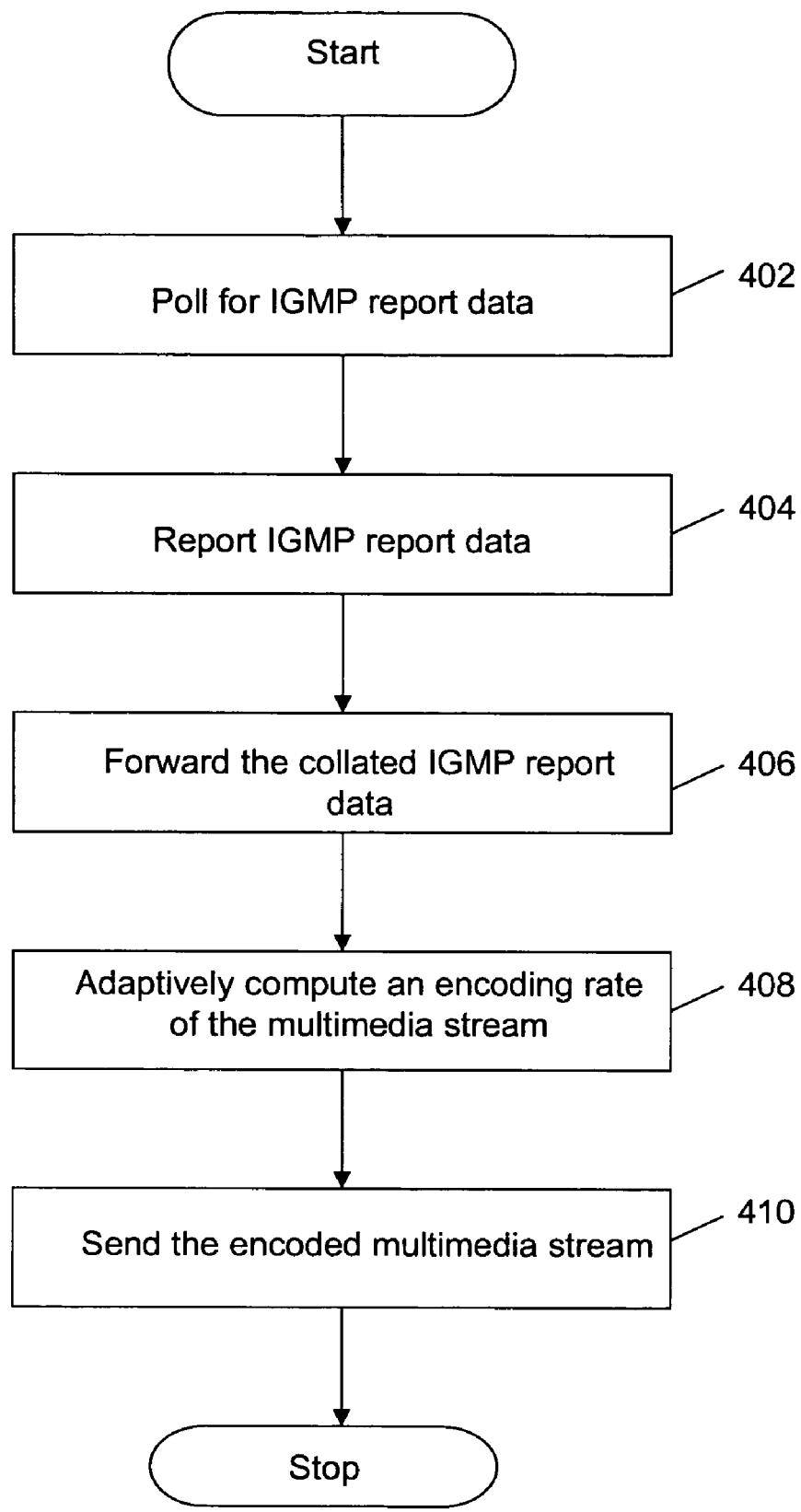
FIG. 4 is a flowchart illustrating an alternate method for sending a multimedia stream in an IP multicast network, in accordance with various embodiments of the invention.

FIG. 4 is a flowchart illustrating an alternate method for sending a multimedia stream in an IP multicast network, in accordance with various embodiments of the invention. At step 402, NFCS 106 polls for IGMP report data from FHMR 104. In an exemplary embodiment of the invention, polling for the IGMP report data is performed by using simple network management protocol (SNMP). SNMP is an application layer protocol that facilitates the exchange of management information between network devices. FHMR 104 store the IGMP report data in an appropriate management information base (MIB). An MIB is a collection of information that can be managed by the SNMP manager. The periodicity of polls between FHMR 104 and NFCS 106 is defined in such manner that the communication between FHMR 104 and NFCS 106 is neither very high nor very low, which helps in preventing any loss of the IGMP report data. In various embodiments of the invention, NFCS 106 is configured with each of the IP addresses of FHMR 104. This requires collecting the list of all FHMR 104, and configuring their said IP addresses on NFCS 106.

At step 404, FHMR 104 send the IGMP report data to NFCS 104. The SNMP agent on FHMR 104 responds to NFCS 106 polling by sending the IGMP report data in an appropriate format to NFCS 106. NFCS 106 collates the IGMP report data as described earlier in conjunction with FIG. 1. At step 406, NFCS 106 forwards the collated IGMP report data to EC 108. At step 408, EC 108 adaptively computes an encoding rate. EC 108 may degrade or upgrade the encoding rate of the multimedia stream as may be required on the basis of the popularity and the demand of the multimedia stream. At step 410, the encoded multimedia stream is sent to receivers 100 at the encoding rate that is computed by EC 108.

In an exemplary embodiment of the invention, the method as described in FIG. 3 is used for sending multimedia streams in an ISP environment. An ISP network contains sources for the multimedia streams within it, and is involved in sending multimedia streams to receivers 100, who are its clients. Receivers 100 send the IGMP v3 report data to the PE devices. NFCS polls for the IGMP v3 report data from the PE devices. The PE devices send the IGMP v3 report data to NFCS 106. NFCS 106 forwards the collated IGMP v3 report data to EC 108, which is a part of the ISP network. EC 108 adaptively computes an encoding rate. The encoded multimedia stream is sent to receivers 100, at the encoding rate that is computed by EC 108. Receivers 100 could be connected from remote locations into the ISP network through the PE devices.

In another exemplary embodiment of the invention, the method as described in FIG. 4 is used for sending multimedia streams in a VPN environment. In a VPN environment, the source/sources for multimedia streams lie within VPN sites.

Receivers 100 send IGMP v3 reports to FHMRs 104. NFCS polls for IGMP v3 report statistics from FHMR 104. FHMRs 104 and NFCS 106 also lie within VPN sites close to the source/sources. FHMRs 104 respond with IGMP v3 report data. NFCS 106 forwards the collated IGMP v3 report data to EC 108. EC 108 adaptively computes an encoding rate. EC 108 lies within the VPN sites. The encoded multimedia stream is sent to receivers 100, which lie within the VPN sites at the encoding rate that is computed by EC 108.

Figure 5:
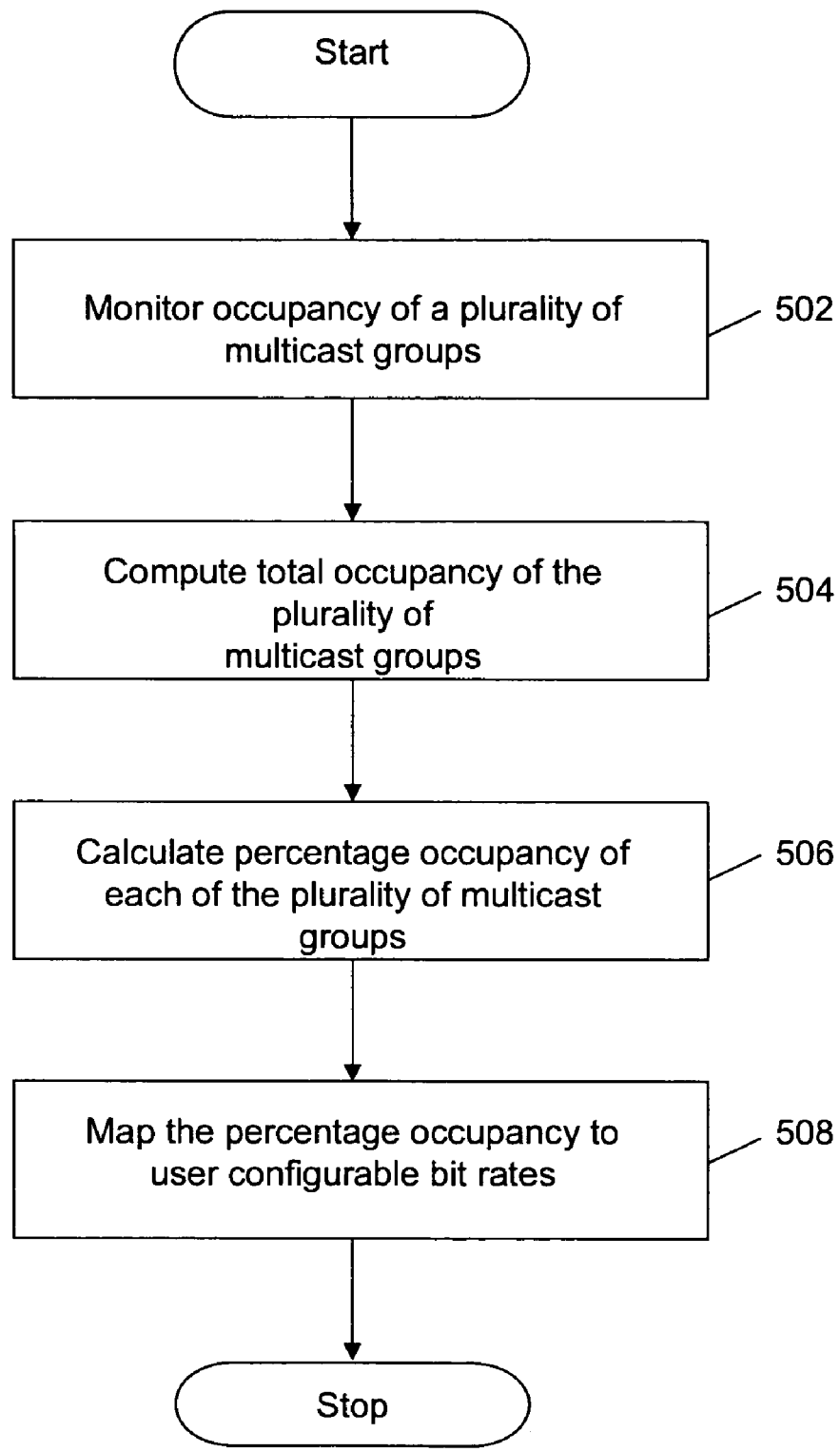
FIG. 5 is a flowchart illustrating a method for adaptively computing an encoding rate of a multimedia stream in an IP multicast network, in accordance with various embodiments of the invention.

FIG. 5 is a flowchart illustrating a method for adaptive encoding of a multimedia stream in an IP multicast network, in accordance with various embodiments of the invention. At step 502, EC 108 monitors the occupancy of a plurality of multicast groups over a period of time. In various embodiments of the invention, occupancy refers to the number of receivers per multicast group per source over a period of time. For example, the number of receivers per multicast group per source are monitored over x minutes, y minutes, and z minutes, where x>y>z. Exemplary values for x, y and z, could be 10, 5 and 2, respectively. In an exemplary embodiment of the invention, an equation (1) represents the total number of receivers t (n), in occupancy of a multicast group per source in x, y, and z minutes.

$$t(n) = (c1*(x\ data) + c2*(y\ data) + c3*(z\ data))/\text{Sum}\ (c(i)) \quad (1)$$

In equation (1), x data, y data, and z data refers to the total number of users observed over a period of x minutes, y minutes and z minutes, respectively; coefficient c1, c2 and c3 refers to the weight given to x data, y data and z data, which are user configurable; and Sum (c (i)) refers to summation of c1, c2, and c3. The number of users t (n) is maintained per multicast group per source. At step 504, EC 108 computes the total occupancy of the plurality of multicast groups over the period of time. The total occupancy of the plurality of multicast groups over the period of time is represented by Sum T(n). Sum T (n) refers to the sum of all t (n). In an exemplary embodiment of the invention, t (n) refers to the occupancy calculated as per the equation 1, for a multicast group O (i, m), where 'm' refers to a specific multicast group and 'i' refers to a specific source for that multicast group. In another exemplary embodiment of the invention, with no source specific information, t (n) refers to the occupancy calculated as per the equation 1, for a multicast group O (i, m) where 'i' is of no significance and 'm' refers to a specific multicast group. This implies that t (n) relates to the occupancy for O (i, m), which refers to the multicast group as a whole with no specific source considered. In an exemplary embodiment of the invention, the Sum T (n) is the total occupancy of the entire multicast groups serviced by the EC.

At step 506, EC 108 calculates percentage occupancy for each of the plurality of multicast groups, with respect to the total occupancy of the plurality of multicast groups over the period of time. For example, the percentage occupancy for a stream from source 'i' belonging to multicast group m can be represented by an equation (2):

$$O(i, m) = t(n)/T(n) \quad (2)$$

At step 508, EC 108 maps the percentage occupancy of the multimedia stream for each of the plurality of multicast groups to user configurable bit rates. In various embodiments of the invention, specific ranges of O (i, m) can be mapped to specific bit rates through a bandwidth table configured by a network administrator. The maximum bit rate supported cannot be exceeded by O (i, m). Hence, a value of O (i, m) can be floored to the highest bit rate supported in case O (i, m) exceeds the highest bit rate supported (e.g. Line rate of an interface). In an embodiment of the invention, an additional weight or priority multiplier can be added to each of the multimedia streams if there is a need to upgrade the encoding rates of specific high priority streams. In an embodiment of the invention, all streams going through EC 108 can have a base kbps that is assured for multimedia streams that are encoded. Even if a multimedia stream has just a single receiver, the base kbps rate would ensure that the quality of the multimedia stream does not suffer. The base kbps is the lower threshold for the bandwidth table that can be configured for EC 108. Therefore, even if the number of receivers is less for a specific multimedia stream, EC 108 continues to send that multimedia stream with the base kbps and would not let it fall down below the configured lower threshold. Thus, the quality of the multimedia stream with less number of users can be ensured.

Embodiments of the present invention have the advantage that the encoded multimedia streams can be send in an IP multicast network at specific user configurable bit rates. The encoding rates of the multimedia streams can be adaptively monitored and calculated/recalculated, based on the occupancy of a plurality of multicast groups. The adaptive nature of various embodiments of the invention helps in tuning the quality of the multimedia streams in such a way that more popular multimedia streams get better delivery, at the same time ensuring the quality of less popular multimedia streams. For example, if there is only one multimedia stream with one receiver, then t (n)=1, Sum T (n)=1, and hence, O (i, m)=1. When this O (i, m) is multiplied by an appropriate entry in the bandwidth table, it implies that the entire bandwidth on EC 108 can be dedicated to that multimedia stream. Usage of a closed loop feedback of IGMP data provides an accurate picture of popularity associated with each multimedia stream. This can help in ensuring more encoding bandwidth to more popular multimedia streams. The facility of multicasting can be better served as the bandwidth utilization for more popular multimedia streams is better compared to unicasting. Various embodiments of the invention can also be extended to vary other parameters of the streaming traffic. For example, the quality of service (QoS) of the streaming traffic that is being served out of a streaming server may be varied.

Although the invention has been discussed with respect to specific embodiments thereof, these embodiments are merely illustrative, and not restrictive, of the invention. For example, a 'method for sending a multimedia stream' can include any type of analysis, manual or automatic, to anticipate the needs of sending a multimedia stream in IP multicast network.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for sending a multimedia stream in an IP multicast network, the method comprising
   collecting protocol report data by a plurality of routers;
   reporting the protocol report data to a netflow collection sewer, wherein the netflow collection server collates the protocol report data;

forwarding the collated protocol report data to an encoder coordinator;

adaptively computing an encoding rate of the multimedia stream by the encoder coordinator based on occupancy of a plurality of multicast groups, the occupancy calculated using the collated protocol report data; and sending the encoded multimedia stream to a plurality of receivers in a multicast group registered to receive the multimedia stream at the adaptively computed encoding rate.

2. The method of claim 1, further comprising computing the number of receivers per multicast group per source.

3. The method of claim 1, further comprising configuring each of the plurality of routers with the IP address of the netflow collection server.

4. The method of claim 1, wherein the plurality of routers comprises a plurality of first hop multicast routers.

5. The method of claim 1, wherein adaptively computing an encoding rate of the multimedia stream further comprises
monitoring occupancy of the plurality of multicast groups over a period of time;
computing the total occupancy of the plurality of multicast groups over the period of time;
calculating a percentage occupancy for each of the plurality of multicast groups with respect to the total occupancy of all the multicast groups over the period of time; and
mapping the calculated percentage of each of the plurality of multicast groups to user configurable bit rates.

6. The method of claim 1, further comprising adding a priority multiplier to upgrade the encoding rate of the multimedia stream.

7. The method of claim 1, further comprising assuring a base encoding rate for the encoded multimedia stream.

8. The method of claim 1, wherein the plurality of routers comprise provider edge devices.

9. The method of claim 1, further comprising sending the multimedia stream to the plurality of receivers in a virtual private network.

10. The method of claim 1, further comprising polling for the internet group management protocol report data from a plurality of routers by a net flow collection server.

11. The method of claim 1, further comprising setting the periodicity of polls between the plurality of routers and the net flow collection server.

12. A method for adaptively computing encoding rate of a multimedia stream in IP multicast network, the method comprising
monitoring occupancy of a plurality of multicast groups over a period of time;
computing the total occupancy of the plurality of multicast groups over the period of time;
calculating a percentage occupancy of the multimedia stream for each of the plurality of multicast groups with respect to the total occupancy of all the multicast groups over the period of time; and
mapping the percentage occupancy of the multimedia stream for each of the plurality of multicast groups to user configurable bit rates.

13. An apparatus for sending a multimedia stream in an IP multicast network, the apparatus comprising
means for collecting protocol report data by a plurality of routers;
means for collating the protocol report data;
means for adaptively computing an encoding rate of the multimedia stream based on occupancy of a plurality of multicast groups, the occupancy calculated using the collated protocol report data; and
means for sending the encoded multimedia stream to a plurality of receivers in a multicast group registered to receive the multimedia stream at the adaptively computed encoding rate.

14. A system for sending a multimedia stream in IP multicast network, the IP multicast network comprising one or more routers for collecting protocol report data, the system comprising
a net flow collection server for collating the protocol report data received from the one or more routers;
an encoder coordinator for adaptively computing an encoding rate of the multimedia stream based on occupancy of a plurality of multicast groups, the occupancy calculated using the collated protocol report data; and
a multimedia server for sending the encoded multimedia stream to a plurality of receivers in a multicast group registered to receive the multimedia stream at the adaptively computed encoding rate.

15. An apparatus comprising:
one or more processors; and
a computer readable storage medium encoded with one or more instructions for execution by the one or more processors, the one or more instructions when executed operable to:
receive protocol report data by a plurality of routers, the protocol report data collated to indicate a number of receivers per multicast group for a plurality of multicast groups;
adaptively compute an encoding rate of a multimedia stream based on occupancy of a plurality of multicast groups using the number of receivers per multicast group; and
send the encoded multimedia stream to a plurality of receivers in a multicast group registered to receive the multimedia stream at the adaptively computed encoding rate.

16. The apparatus of claim 15, wherein the number of receivers per multicast group is computed per source.

17. The apparatus of claim 15, wherein the one or more instructions when executed are further operable to assure a base encoding rate for the encoded multimedia stream.

18. The apparatus of claim 15, wherein the plurality of routers comprise a plurality of first hop multicast routers.

19. The apparatus of claim 15, wherein one or more instructions operable to adaptively compute an encoding rate of the multimedia stream further comprise one or more instructions operable to:
monitor occupancy of the plurality of multicast groups over a period of time;
compute the total occupancy of the plurality of multicast groups over the period of time;
calculate a percentage occupancy for each of the plurality of multicast groups with respect to the total occupancy of all the multicast groups over the period of time; and
map the calculated percentage of each of the plurality of multicast groups to user configurable bit rates.

20. The apparatus of claim 15, wherein the one or more instructions when executed are further operable to add a priority multiplier to upgrade the encoding rate of the multimedia stream.

* * * * *